H. J. MURRAY.
SAFETY CONTROLLING DEVICE.
APPLICATION FILED APR. 23, 1915.
1,268,268.
Patented June 4, 1918.
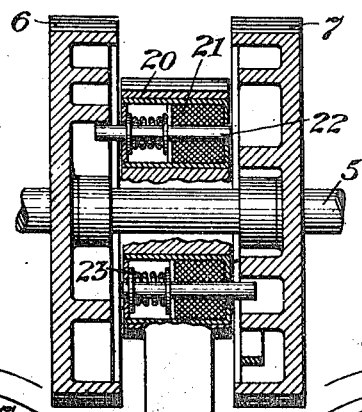
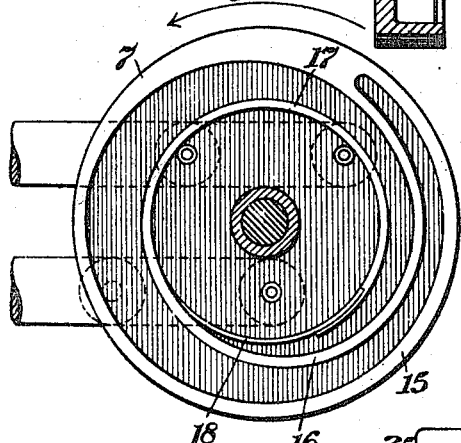
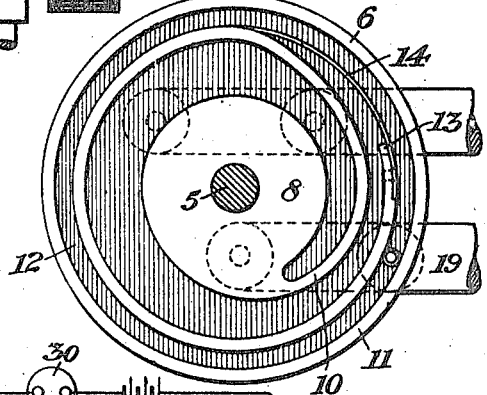
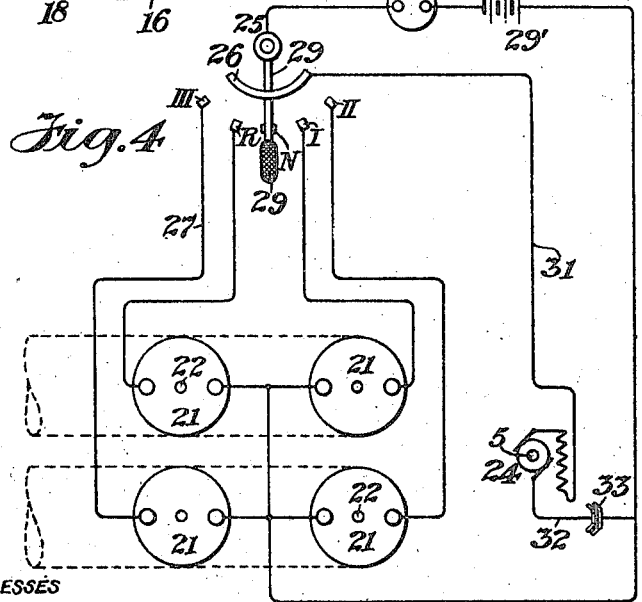
WITNESSES
Chas. J. Clagett
S. A. Thornton.
INVENTOR
Howard J. Murray
BY Messimer and Austin
HIS ATTORNEYS

UNITED STATES PATENT OFFICE.

HOWARD J. MURRAY, OF NEW YORK, N. Y.

SAFETY CONTROLLING DEVICE.

1,268,268.　　　　　Specification of Letters Patent.　　Patented June 4, 1918.

Application filed April 23, 1915. Serial No. 23,438.

*To all whom it may concern:*

Be it known that I, HOWARD J. MURRAY, a citizen of the United States, and resident of New York city, in the county of Kings and State of New York, have invented certain new and useful Improvements in Safety Controlling Devices, of which the following is a specification.

My invention relates in general to safety controlling devices for selectively actuating one of a plurality of controlling mechanisms in proper operative sequence from a single control station and particularly relates to electrically controlled and mechanically actuated means for selectively shifting the rods controlling the transmission gears in motor vehicle construction and for locking the gears in their shifted or neutral positions.

One of the general objects of the invention is to provide a simple form of mechanism which will positively move the desired control member into an operative position and automatically lock the member in its operative position by the closing of a selective switch at the control station and which will positively and automatically return the control members to their initial positions either by the opening of the switch or by any accident which might happen to the electric controlling mechanisms.

Among the specific objects of the invention when considered in connection with its application to a gear shifting device is to shift the gears without release of springs or any other restraining device and to shift the gears without tension other than that necessary to hold the gears in their meshed positions.

A further object of the invention is to provide a device of the above indicated character which is designed to be coupled either momentarily or continuously with any rotating power driven element.

I attain these objects broadly by providing two disks rotating about a common axis and one or more gear shifting control rods positioned between the disks with each rod provided with an electro-magnet the plunger of which is designed to be projected toward one of the disks mechanically and toward the other disk by completing the circuit through the electromagnet. One of the disks is provided with a cam throw designed to move the rods in one direction when engaged by the magnetically actuated plunger and the other disk is provided with a cam throw oppositely disposed and designed to move the rods in the opposite direction when engaged by the movement of the plunger acting under its mechanically actuated force. The electromagnets are energized selectively by the closing of a suitable switch for this purpose.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:

Figure 1 is a sectional view of a preferred embodiment of my invention taken axially through its driving shaft;

Figs. 2 and 3 are transverse sectional views both taken on the line 2—2 of Fig. 1 and looking in opposite directions therefrom so as to show adjacent faces of the disks; and Fig. 4, is a diagrammatic view of some of the mechanism of Fig. 1, together with the electric connections leading from a central controlling station.

As the invention may be admirably embodied in a gear shifting mechanism for automobiles it will be described in connection with such a device but it will be readily appreciated that the invention is not so limited but may be utilized wherever an electrically controlled selective means is utilized to govern the coöperative actuation of different mechanical elements. In the following description and in the claims, parts will be identified by specific names for convenience of expression but they are intended to be as generic in their application to similar parts as the art will permit.

In Figs. 1, 2 and 3 of the drawings there is illustrated a mechanism which may be mounted upon any convenient portion of an automobile preferably adjacent the transmission box or other device to be controlled. This mechanism comprises an actuator shaft 5 which may be driven from any suitable mechanism such as an electric motor particularly designed for this purpose, from the vehicle propelling engine or from any other suitable prime mover. A pair of similar disks 6 and 7 are fixed centrally to the shaft so as to rotate therewith and are slightly spaced apart thereon. One of said disks 6, hereinafter referred to as the shifter, has a circular projection 8 with its center at the axis of rotation of the shaft. This projection is in the form of a small circular disk projection from the side of the shifter facing the other disk. The periphery of this circular projection provides a bearing or guiding wall which leads to a spiral portion of a flange 10 which spiral portion extends from one edge of the projection 8 and evolves outwardly in an anti-clockwise direction to form a volute bearing surface. The free end of the flange 10 is circular for about 250°. The shifter is outlined by a peripheral flange 11 spaced from the circular portion of the flange 10 a distance sufficient to form a groove 12 designed to accommodate therein one end of a clutch element hereinafter described. The free end 13 of the flange 10 has an outwardly opening curved gate 14 with one end fixed thereto and forming a continuation thereof with the free end meeting the flange 10 adjacent the juncture of the spiral and circular position thereof. This gate is preferably in the form of a curved leaf spring, one end of which is attached as by means of flush rivets to the flange.

The other disks 7, hereinafter referred to as a neutralizer, has an outlining peripheral flange 15 similar to and projecting toward the flange 11. Leading from the inner wall of this flange is an inwardly curving clockwise spiral flange 16, the inner end of which is formed into a substantially closed annular band 17. An inwardly opening curved gate 18 similar to the gate 14 forms a continuation of the annular band so as to form a closed interior circular bearing surface on the inner side thereof concentric with reference to the axis of rotation of the shaft. The interior bearing surface on the neutralizer is disposed opposite the exterior circular bearing surface on the projection 8 of the shifter, but has a diameter greater than the diameter of the disk projection so as to accommodate the clutch element which may be projected laterally into engagement with either bearing surface.

This mechanism is designed to actuate one of a plurality of control members 19 four of which are herein illustrated, but it is to be understood that any number of these control members may be actuated from the one mechanism and the detail description of any one will be sufficient for any number of said members. The members herein illustrated are in the form of control rods and are intended to represent means for shifting the gears in the transmission box used on motor vehicles to obtain the different forward and the reverse speeds. Considering any one, as for instance, the rod controlling the first speed, it will be noted that one end thereof is positioned between the actuator and neutralizer with an electromagnet casing 20 fixed thereto and substantially extending from one disk to the other. The casing contains a selective electromagnet 21 of the plunger type, the plunger 22 of which is free to be projected beyond the outlines thereof at opposite ends so as to extend into the grooves formed in the neutralizer when projected in one direction or into the grooves of the shifter when projected in the reverse direction. The plunger is of such a length that it will be free of one of the disks when engaged in the groove on the other disk. A spring 23 bears on the plunger and maintains the same in operative engagement with the grooves in the neutralizer when the electromagnet is deënergized.

To illustrate the installation of one practical application of this improvement reference is made to Fig. 5 showing diagrammatically the arrangement of an embodiment of the invention on a motor vehicle. The symbol 24 may be considered as a series wound electric motor for rotating the power shaft 5, but obviously this symbol might be regarded as a selective control for inaugurating the action of any suitable driving mechanism. The device may be governed from a central control station such as the steering column of a motor vehicle which may be equipped with some suitable selective switch 25. This switch includes a motor control contact plate 26 and contact points I, II, III, indicating respectively first, second and third speed ahead, R indicating a reverse speed and N indicating neutral. Each of these contact points, except N, has a conductor 27 leading to one side of one of the electro-magnets 21 on the shifter rods. Opposite sides of all of the electro-magnets are connected by means of a common return conductor 28 with the hand control lever 29 of the control switch. This lever is designed to complete the circuit either through the contact plate 26 or through one of the contact points I, II, III or R. The conductor 28 is in circuit with a source of electric energy 29 and may contain a suitable cut-out switch 30. From the motor 24 a conductor 31 leads to the contact plate 26 and a conductor 32 leads from the opposite side of the motor to the conductor 28 and is connected to the same at some point between the electromagnets and the source of energy. The conductor 32 preferably includes a switch 33 operatively connected with the foot controlled clutch usually found on automobiles. This switch is so arranged that the circuit is completed through this switch only when the clutch is "out."

In operation let it be assumed that the vehicle is standing with the vehicle engine running, the clutch "out" and the switch 30 turned on. The lever 29 is moved from its neutral position shown to engage the motor control contact plate, thus closing the circuit through the motor. The motor rotates the shaft 5 and causes the neutralizer to return all shifted rods into their neutral positions in the manner hereinafter described, should any of the gear sets be in mesh.

Suppose it is desired to shift the gears to obtain a definite set thereof as for instance to obtain the arrangement to provide a first speed ahead; the control lever is moved into engagement with the contact I, thus completing the circuit from the source 29, through the conductor 27 attached to the contact I, through the electromagnet on the proper rod to obtain the desired shift, through the return conductor 28 back to the source. Energizing the electromagnet causes the end of its plunger to be withdrawn out of engagement with the neutralizer, against the tension of the spring, and projects the opposite end of the same into contact with the circular bearing surface of the shifter. This shifter is rotating in the clockwise direction indicated by the arrow and the spiral portion of the bearing surfaces act on the electromagnetically projected plunger to move the rod carrying the electromagnet longitudinally and thus obtain the desired shift of gears. In effect the electromagnet plunger moves about the circular portion of the bearing surface, then along the spiral groove, past the gate and into the outer circular groove. The gate closes to behing the plunger thus confining the same into a travel about its peripheral groove and thus lock the actuator rod in its shifted position. This condition will be maintained until the control lever is shifted from its first speed contact or until the circuit is otherwise broken as by an accident to the electric mechanism. As soon as the electromagnet under consideration is deënergized, the spring controlling the plunger is free to act thereon and to withdraw the plunger from its engagement with the shifter and to eject the same into the outer groove of the neutralizer. This neutralizer is turning as indicated by the arrow in such a direction as to cause the plunger and with it the controlled rod, to be shifted back into its initial position. The opposite end of the plunger moves in the groove past the gate and into the inner closed circular bearing, thus locking the control rod in its neutral position. The shaft may continue to rotate but this will have no effect either on the shifted rod nor on the rods which are locked in their neutral or inoperative position. Another combination of gears is shifted in the same manner except, of course, a different electromagnet is actuated, but due to the fact but one electromagnet can be energized at a time, only one control rod can be in shifted position.

It is noted that by means of a device of this character, there is an automatic actuation which will throw "out" or return to neutral any gear combination, which will throw "in" any desired gear combination and which will allow the clutch to be operated after the gear is shifted without effecting the gear set in its shifted position.

The power for actuating the shift may be obtained from any suitable mechanism such as a gasoline motor or from an electric motor operated from a storage battery, such as is usually used on motor vehicles.

The electromagnets are released from their clutching engagement and the control members are returned to neutral without releasing any springs or other restraining device and no tension is used except that normally required to hold the gears in place, either in their shifted, neutral or intervening positions.

The device possesses certain safety features in that it is not possible to operate the same except when the clutch is "out" and any accident to the electric device controlling the electromagnets will cause the electromagnets to become deënergized and thus permit the springs to move the plungers into engagement with the neutralizer which will move all the control rods into an inoperative position if the shaft is turning at all. It is obvious that any desired movement of the control rods may be attained such as a slow start and quick finish merely by changing the character of the cam bearing surface on the actuator and neutralizer.

The device possesses other safety features, it being noted that it is not possible to shift from one gear combination to another without first returning all parts to their neutral or safety position.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention which is limited by the scope of the claims.

Having thus described my invention, I claim:

1. In a device of the class described, the combination of a shaft mounted for rotary movement, a cam fixed to said shaft, and provided with a spiral bearing surface coiled about the axis of the shaft, a control rod extending parallel to the face of said cam and mounted for reciprocatory movement and electromagnetically actuated means carried by said rod and adapted to be moved into engagement with the bearing surface whereby the rotary motion of the shaft is transmitted into a line movement of said rod in one direction.

2. In a device of the class described, the combination of a shaft mounted for rotary movement, a cam fixed to said shaft, and provided with a spiral bearing surface coiled about the axis of the shaft, a control rod extending parallel to the face of said cam and mounted for reciprocatory movement, electromagnetically actuated means carried by said rod and adapted to be moved into engagement with the bearing surface whereby the rotary motion of the shaft is transmitted into a line movement of said rod in one direction and means actuated by said shaft for returning said control rod in the opposite direction into its initial position.

3. In a device of the class described, the combination of a shaft mounted for rotary movement, a pair of disks spaced apart and fixed to said shaft to rotate therewith, a control rod disposed between said disks, a clutching element carried by said rod for connecting the same at will with either of said disks and simultaneously moving the same into an inoperative position relative to the other disk, one of said disks being provided with means for co-acting with said clutching means to move the rod in one direction and the other disk being provided with similar means for moving the rod in the opposite direction and selective means for operating said clutching means.

4. In a device of the class described, the combination of a shaft mounted for rotary movement, a control rod mounted for reciprocatory movement, a two position clutch member carried by said rod, means co-acting with said member in one of its positions connecting said shaft and rod to throw the rod in one direction and means co-acting with said member in the other of its positions connecting said shaft and rod to throw the rod back into its initial position and means moving said clutch member into one of said positions.

5. In a device of the class described, the combination of a shaft mounted for rotary movement, a control rod mounted for reciprocatory movement, a two position clutch member carried by said rod, means co-acting with said member in one of its positions connecting said shaft and rod to throw the rod in one direction and means co-acting with said member in the other of its positions connecting said shaft and rod to throw the rod back into its initial position, means moving said clutch member into one of said positions, and means for returning said clutch member into the other of said positions automatically when first named means become inoperative.

6. In a device of the class described, the combination of a shaft mounted for rotary movement, a control rod extending transversely of said shaft, a clutch member carried by said rod, a co-acting clutch and advancing member fixed to the shaft and operated by the rotation thereof and electromagnetically actuated means for moving said members relative to each other into a clutching engagement whereby the shaft will advance the rod longitudinally for a definite distance.

7. In a device of the class described, the combination with a power member mounted for rotary movement and provided with a cam bearing surface, of an actuated member, a clutch fixed to the member and designed to engage said cam surface whereby the rotary movement of the power member is transferred into a shifting movement of said member and electrically actuated means for controlling said clutch.

8. In a device of the class described, the combination of a shaft mounted for rotary movement, a control for extending transversely of said shaft, a clutch member carried by said rod, a co-acting clutch and advancing member fixed to the shaft and operated by the rotation thereof, electromagnetically actuated means for moving said members relative to each other into a clutching engagement whereby the shaft will advance the rod longitudinally for a definite distance and another clutch and advancing member fixed to the shaft and adapted to co-act with the clutch member carried by the rod to return the shifted rod to its initial position.

9. In a device of the class described, the combination of a cam faced disk mounted for rotary movement about a fixed axis, a control member extending across the face of said disk, a clutch member carried by the control member and means for moving said clutch member into engagement with the cam on the face of the disk whereby the revolving cam will shift the control rod.

10. In a device of the class described, the combination of a cam faced disk mounted for rotary movement about a fixed axis, a control member extending across the face of said disk, a clutch member carried by the control member and electrically controlled means for moving said clutch member into engagement with the cam on the face of the disk whereby the revolving cam will shift the control rod.

11. In a device of the class described, the combination of a cam mounted for rotary movement, a control member, a plunger carried by the control member and means for moving said plunger into engagement with the cam whereby the revolving cam will shift the control member, said cam being provided with means coacting with said plunger for maintaining said control member in set position.

12. In a device of the class described, the combination of a shifting member mounted to be moved longitudinally in one direction, a rotary member having a cam surface with a travel in said direction and a plunger carried by the shifting member and adapted to be moved into engagement with said cam surface whereby the rotation of said rotary member will act on the shifting member to move the same in said direction.

13. In a device of the class described, the combination of a cam faced disk mounted for rotary movement about a fixed axis, a control member extending across the face of said disk, a clutch member carried by the control member, means for moving said clutch member into engagement with the cam on the face of the disk whereby the revolving cam will shift the control rod and mechanically actuated means for withdrawing said clutch member out of engagement with said cam.

14. In a device of the class described, the combination of a disk mounted for rotary movement about a fixed axis, said disk being provided with a spiral flange positioned about said axis, one end of said flange leading into an annular flange concentrically disposed about said axis and a clutch member adapted to be engaged by said flange to move the member along the spiral portion thereof and to hold the member fixed relative to the axis at the annular portion of the flange.

15. In a device of the class described, the combination of a cam faced disk mounted for rotary movement about a fixed axis, a control member extending across the face of said disk, a clutch member carried by the control member, means for moving said clutch member into engagement with the cam on the face of the disk whereby the revolving cam will shift the control rod, said cam face being provided with means co-acting with said clutch member for maintaining said control member in set position and means normally forming said annular part into a closed bearing surface for the clutching means.

16. In a device of the class described, the combination of a cam faced disk mounted for rotary movement about a fixed axis, a control member extending across the face of said disk, a clutch member carried by the control member, means for moving said clutch member into engagement with the cam on the face of the disk whereby the revolving cam will shift the control rod, mechanically actuated means for withdrawing said clutch member out of engagement with said cam and means normally forming said annular part into a closed bearing surface for the clutching means.

17. In a device of the class described, the combination of two disks facing each other and adapted to be rotated about a common axis and in the same direction the adjacent faces of each disk being provided with spiral bearing members, one of said members being involute and the other being evolute relative to the direction of rotation of the disks, a control member positioned between said disks and mounted for longitudinal movement across the faces of said disks, a clutch member carried by said control member adapted to engage said spiral members to be shifted thereby, said clutch member being disconnected from one of the bearing members while in operative engagement with the other bearing member.

18. In a device of the class described, the combination of two disks facing each other and adapted to be rotated about a common axis and in the same direction the adjacent faces of each disk being provided with spiral bearing members, one of said members being involute and the other being evolute relative to the direction of rotation of the disks, a control member positioned between said disks and mounted for longitudinal movement across the faces of said disks, a clutch member carried by said control member adapted to engage said spiral members to be shifted thereby, said clutch member being disconnected from one of the bearing members while in operative engagement with the other bearing member and selective means operatively connected to said clutch member to move the same at will from operative engagement with one of the bearing members into operative engagement with the other bearing member.

19. In a device of the class described, the combination of a cam mounted for rotary movement about a fixed axis of rotation, a plurality of separate control rods, each of said rods being provided with a clutch member adapted to be projected into operative engagement with said cam so as to be shifted thereby and selective controlling means for operating any one of said clutch members at will.

20. In a device of the class described, the combination of a cam mounted for rotary movement, a plurality of separate control rods, each of said rods being provided with a clutch member adapted to be projected into operative engagement with said cam so as to be shifted thereby and selective controlling means for operating any one of said clutch members at will and means for locking the shifted rod in position while permitting rotation of said cam.

21. In a device of the class described, the combination of a cam mounted for rotary movement about a fixed axis of rotation, a plurality of separate control rods extending across the face of said cam, each of said rods being provided with a clutch member adapted to be projected into operative engagement with said cam so as to be shifted thereby, selective controlling means for operating any one of said clutch members at will and means for locking all the rods except the shifted rods in their normal inoperative positions.

22. In a device of the class described, the combination of a driven shaft mounted for rotary movement about a fixed axis, a pair of disks fixed to said shaft to rotate therewith, adjacent faces of said disks being provided each with a volute bearing surface, and with a circular bearing surface forming a continuation of said volute bearing surfaces, a control rod positioned between said disks, said rod being provided with an electromagnet having a plunger adapted to be projected thereby in one direction into engagement with the bearing surface on one of the disks, a spring acting on said plunger normally to project the same into engagement with the bearing surface on the other disk, the bearing surface on one of the disks adapted to force the rod in one direction when engaged by the plunger and the bearing surface on the other disk adapted to force the rod in the opposite direction when engaged by the plunger.

Signed at New York, in the county of New York and State of New York, this thirteenth day of April, A. D. 1915.

HOWARD J. MURRAY.

Witnesses:
M. J. COOPER,
S. A. THORNTON.